Figure 1:
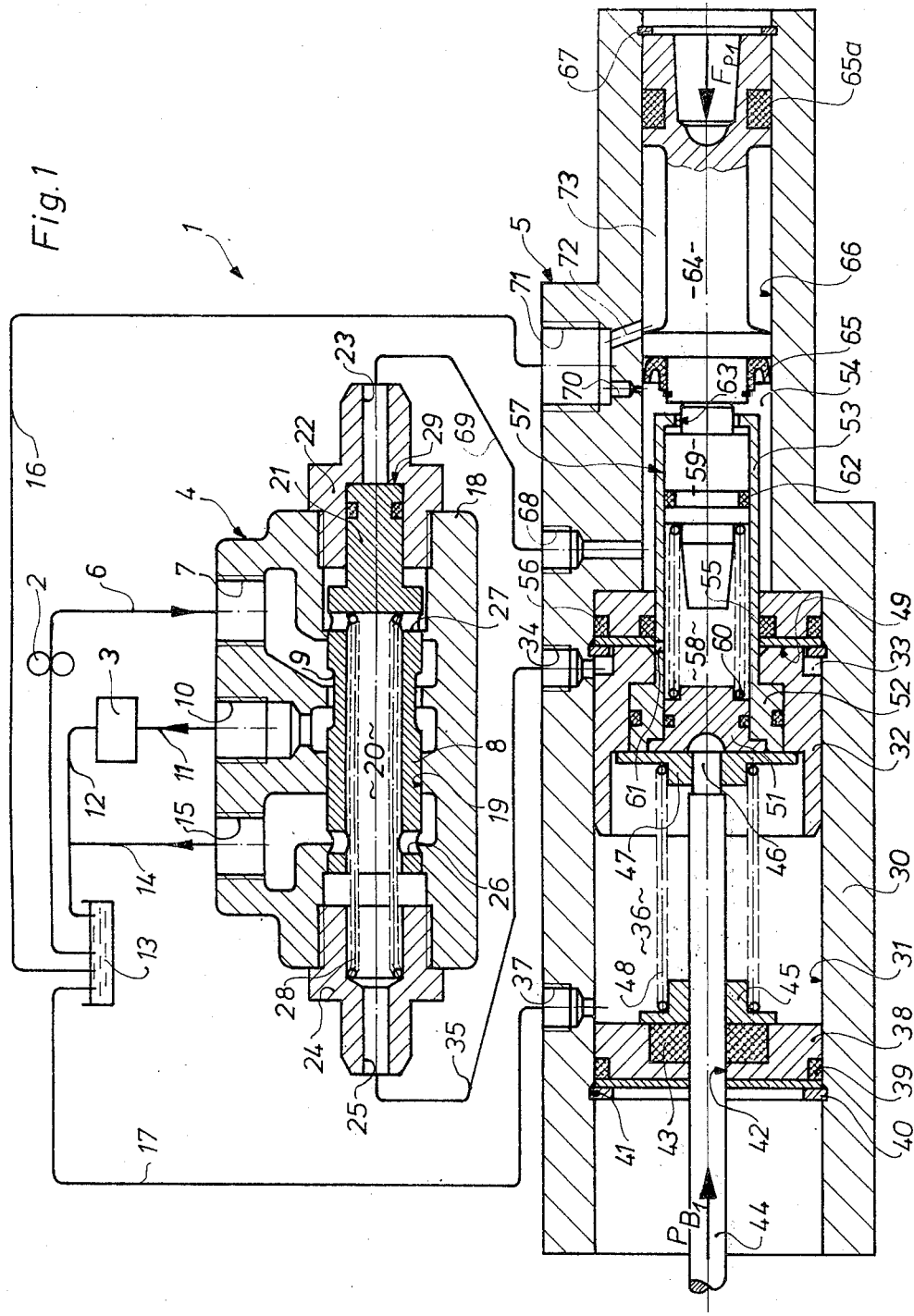

United States Patent [19]
Lauer et al.

[11] 3,921,502
[45] Nov. 25, 1975

[54] POWER BOOST MECHANISM

[75] Inventors: Josef Lauer, Nonnweiler; Alfred William Thomas, Saarbrucken, both of Germany

[73] Assignee: Deutsche Bendix Ausrustungs GmbH, Saarbrucken, Germany

[22] Filed: Mar. 27, 1974

[21] Appl. No.: 455,106

[30] Foreign Application Priority Data
Apr. 12, 1973 Germany............................. 2318447

[52] U.S. Cl.................................. 91/391 R; 91/460
[51] Int. Cl.²...................... F15B 13/10; F15B 17/02
[58] Field of Search............. 91/460, 391 R; 60/548, 60/587, 555

[56] References Cited
UNITED STATES PATENTS
3,831,491  8/1974  Thomas ............................... 91/460
3,838,629  10/1974  Meyers ................................ 91/460

*Primary Examiner*—Paul E. Maslousky
*Attorney, Agent, or Firm*—Ken C. Decker; William N. Antonis

[57] ABSTRACT

A hydraulic brake booster is disclosed which includes a working chamber, a piston slidable in the working chamber, a fluid pressure actuated valve which controls communication into the working chamber, a control chamber for developing fluid pressure to actuate the valve, and an operator-actuated input plunger for controlling the pressure level in the control chamber. A differential pressure responsive piston is slidably mounted in a reservoir carried within the booster housing and is adapted to slide within the reservoir when the pressure level in the control chamber exceeds the pressure level in the working chamber by a predetermined amount, to thereby reduce the pressure level in the control chamber.

8 Claims, 5 Drawing Figures

POWER BOOST MECHANISM

This invention relates to a power boost mechanism, especially to a power boost mechanism comprising servo-valve means for controlling a variable working fluid pressure acting on an output piston sealingly received in a working chamber of an output servomotor housing, said servo-valve means being responsive to a control pressure of an incompressible fluid contained in an enclosed control chamber and actuated thereby, said control pressure varying as a function of the displacement in said chamber of an input plunger operatively connected to said output piston.

Such a power boost mechanism especially adapted for use in motor vehicles was disclosed in the German Patent application No. P 25,125,880.0, corresponds to U.S. Pat. No. 3,831,491. A further development of this invention was proposed in the, as yet unpublished, German Patent application No. P 2,260,246.6 corresponding to U.S. patent application Ser. No. 421,464, filed Dec. 3, 1973. The embodiments in both proposals use a control valve comprising a non-return valve. This non-return valve has two main functions. Firstly it allows a gradual change-over from a hydraulic to a mechanical connection between the input-control member and the output-control member, when this becomes necessary due to the failure of the control or working-pressure, or through actuation beyond power run-out (max. boost pressure). Secondly, the non-return valve prevents an excessive loss of force, between the input force developed by the input-control member and the output force developed by the output control member, when the input control member presents a larger cross-section than the output control member. The use of such a non-return valve results in more complicated design and creates a possible operating failure source especially due to wear or contamination e.g. of the valve seats concerned.

Furthermore, after operation through power run-out, during the return stroke, a sudden increase in the reaction force on the input control member is experienced, because the pressure in the working chamber decreases due to the return of the control piston at pressures below run-out. Usually the run-out point is chosen well above wheel-lock system pressure so that this sudden increase in pedal effort is only apparent as a result of e.g. panic braking with extraordinarily high pedal effort and then only if the pedal, after such an operation, is backed off slowly and not when it is quickly released.

It is the object of this invention to design a power boost mechanism of the type described above which exhibits a smooth reaction force curve while input force on the input control member is decreasing even when run-out has been exceeded.

This is achieved with the present invention by a pressure reservoir responsive to a difference between the control pressure and the working pressure, said pressure reservoir allowing a fluid displacement out of the control chamber when a predetermined pressure difference is reached, and ensuring the return of the displaced fluid into the control chamber after a shortfall in the said pressure difference.

Through use of a pressure reservoir volume is not lost from the control chamber, through a valve, by an operation through power run-out. Rather than this it is stored and is again fully available to the control chamber when pressure falls below "run-out". This immediate return of the displaced volume into the control chamber facilitates an unusually favourable curve of the reaction force acting on the input control member. This means that when the power boost mechanism is used as a brake booster the output force remains continuously dependent on the input force during the full release stroke. This advantage is very significant when the power boost mechanism is used in adaptive braking systems. (so called anti-skid system). Here, particularly the power boost mechanism can be operated with excessive pedal or input force, wheel lock being, however, prevented by appropriate means. Through the smooth reduction in reaction force during gradual pedal force withdrawal the driver receives true information about the output force — i.e. the, to be controlled, braking force.

In a special arrangement, the pressure reservoir is arranged within the output chamber in a servomotor which comprises a working chamber with a bore receiving the working piston, the control chamber being arranged near the working piston and these chambers being sealed hydraulically against each other, whilst an actuating portion of the working piston sealingly received in the housing, projects into the control chamber and forms the output control member. By this arrangement, the output control member can be used as a housing for the pressure reservoir. To reduce the space needed, the pressure reservoir can be arranged concentrically to the working chamber.

In an embodiment comprising an input-control-member arranged in the control chamber such that in the event of failure of the control pressure, the input-control-member abuts the output-control member and thus a mechanical actuating of the working piston is possible, the input-control-member of the servomotor according to the invention is such that it generates a control pressure upon the output-control-member only after the reservoir piston is displaced by a predetermined amount.

In another embodiment, the power boost mechanism comprises an input-control-member, with a larger effective area than the output-control-member, and these members are telescoped together and form a pressure chamber between themselves and the pressure chamber is connected with the control chamber via a check valve controlling the connection and which is held open by a member of the pressure reservoir when at rest but being positively closed, when the pressure reservoir is loaded. This version prevents the sudden outflow of the fluid column between the input and output members in case of control or working pressure failure. The fluid column is formed by the output control member, due to its smaller cross-sectional area, being stroked further than the input control member. The valve ensures a connection between these two members by means of a fluid column. A fall-through of the input control member until it rests purely mechanically on the output control member is eliminated. The first consequence is that, the brake pressure climbs immediately even at pressures above run-out. Secondly in case of a pressure failure the lost motion between input and output control members is eliminated. A similar device was proposed in the heretoforementioned unpublished application compared to which this version is considerably simplified. For instance only one non return valve is necessary here instead of two. This is facilitated only by means of the pressure reservoir, in a preferred version of which the reservoir piston acts as the valve actuating member.

Further features and advantages of the invention will become apparent from the embodiment that is described in the following with references to the drawings. These show:

FIG. 1 A power boost mechanism according to this invention in its use as a brake booster for a motor vehicle brake system in a schematic, sectioned representation.

Figure 2:
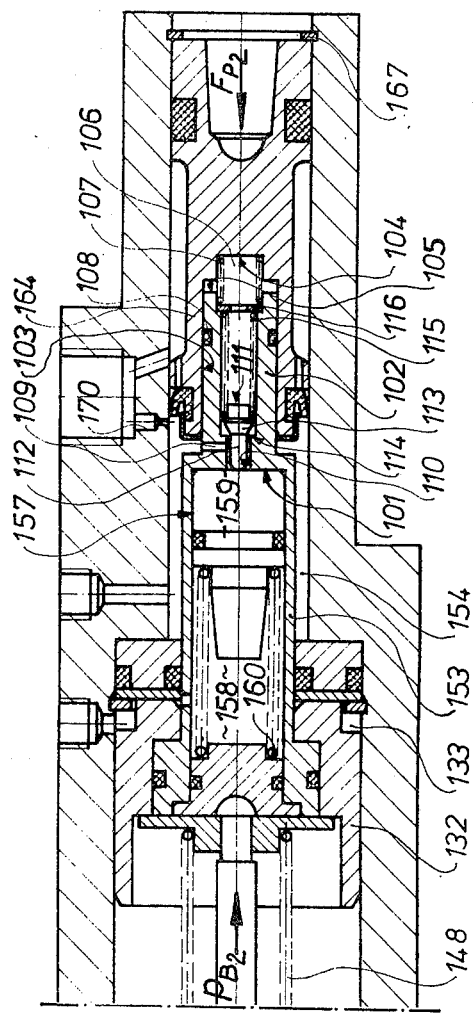

FIG. 2 A part view of a modified power boost mechanism in a schematic, sectional representation.

Figure 3:
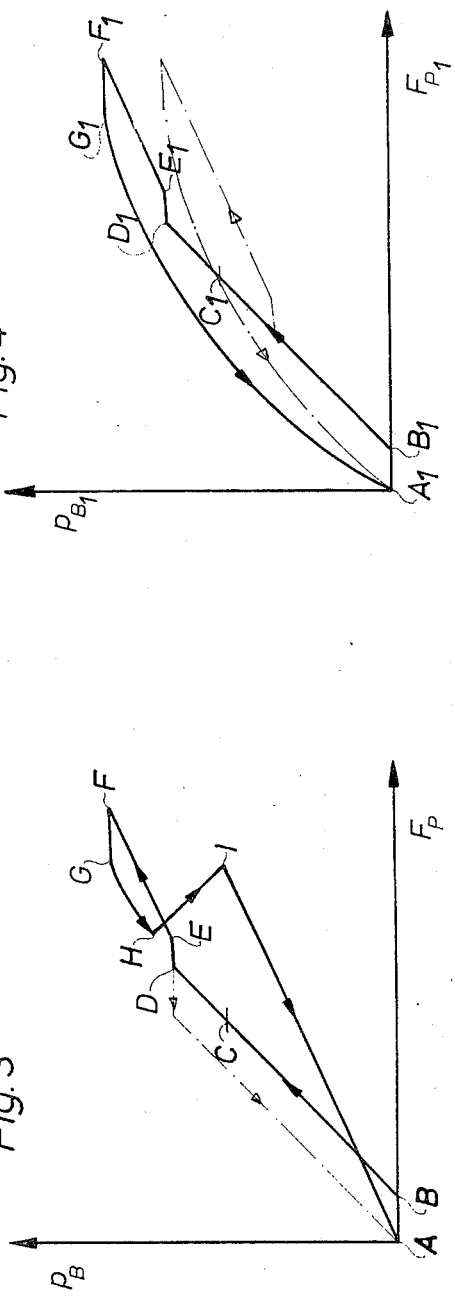

FIG. 3 A curve illustrating the function of pedal or reaction force versus developed brake pressure in an earlier power boost mechanism.

Figure 4:
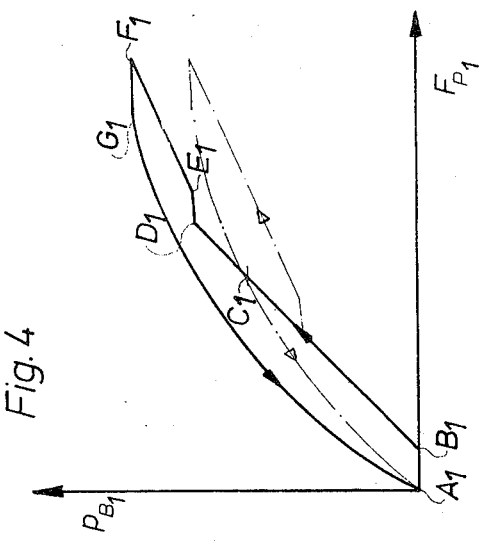
Figure 5:
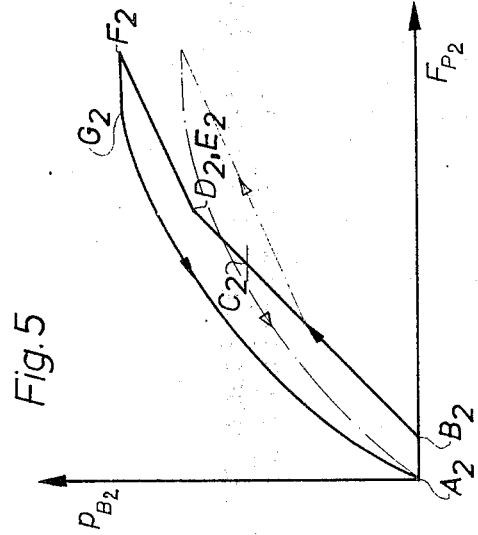

FIG. 4 A curve illustrating the function of pedal or reaction force versus developed brake pressure in a power boost mechanism according to FIG. 2 of this invention, and FIG. 5 A curve illustrating the function of pedal or reaction force versus developed brake pressure in a power boost mechanism according to FIG. 2 of this invention.

In the embodiment shown in FIG. 1 a power boost mechanism 1 which is arranged between a power steering pump 2 and a power steering gear 3 comprises of, substantially, a control valve 4 and a servomotor 5. The pressure fluid is supplied from the pump 2 through a conduit 6 to an input port 7 of the control valve 4. The pressure fluid flows through the control valve 4 via a groove 9 formed in the control spool 8 to an outlet port 10 and thence via a conduit 11 to the steering gear 3. Because the steering gear 3 is normally controlled by an open-centre valve (not shown) the pressure fluid returns through a conduit 12 to a low pressure reservoir. The conduit 12 is connected by means of a T-piece to conduit 14 and thereby to return port 15 of the control valve 4. The low pressure reservoir 3 is also connected by conduits 16, 17 to the servomotor.

The control valve 4 comprises a valve housing 18 with a bore 19 which is connected to the inlet port 7 the outlet port 10 and the return port 15. The bore 19 slidably houses the valve spool 8 which includes an axial channel 20. As shown in FIG. 1 the valve spool 8 forms at one end a reduced diameter control piston 21 sealingly received in a cap 22 which is fitted to the valve housing 18 and which closes one end of bore 19. The cap 22 encloses a control opening 23 connected to the control piston 21. The other end of the bore 19 is closed by a plug 24 fitted into the housing 18. The plug 24 includes a work port 25 which is connected to axial channel 20. The control spool 8 includes a first set of holes 26 which together with bore 19 controls an exhaust connection between return port 15 and work port 25 and a second set of holes 27 which together with bore 19 controls an inlet opening between inlet port 7 and work port 25. As shown in FIG. 1 a spring 28 reacted by plug 24 urges the valve spool 8 elastically against shoulder 29 of cap 22 into its rest position, in which the exhaust connection is open and the inlet connection is closed.

The servo-motor 5 comprises a housing 30 with a bore 31 in which a power piston 32 is sealingly, slidably fitted to form a boost chamber 33. The boost chamber 33 is connected by an opening 34 and a conduit 35 to the work port 25 of the control valve 4. A low pressure chamber 36 connected to the low pressure reservoir 13 via conduit 17 is arranged close to the boost chamber 33. The low pressure chamber 36 is defined on one side by the power piston 32 and on the other side by a plug 38. The plug 38 is sealed with respect to the bore 31 by means of a seal ring 39 and is retained by a spring ring 40 sprung into a groove 41 of bore 31. A seal 43 is fitted into a concentric bore 43 through which push rod 44 is guided. The push rod 44 transmits force to a master cylinder (not shown). The push rod 44 extends into the low pressure chamber 36 through spring seat 45 and locates at its head end 46 a spring seat 47 that rests on the power piston 32. A compression spring 48, which is preloaded between on one side spring seat 45 resting on plug 38 and on the other side spring seat 47 resting on power piston 32, is fitted around push rod 44. Under the preload force of spring 48 the piston 32 is urged on to shoulder 49 of the housing 30. The piston rod 52 rests, as does power piston 32, on spring seat 47. Power piston 32, piston rod 52 and spring seat 51 are sealed relative to each other by means of unspecified seals. The parts 32, 51, and 52 could be built as one part, since they are firmly connected and never move relative to each other. The piston rod 52 extends into a reduced diameter control chamber 54 near the boost chamber 33 through a portion which forms the output control member 53. Boost chamber 33 and control chamber 54 are hydraulically sealed relative to each other by means of seals 55 and 56.

Inside the output control member 53 a pressure reservoir in the form of a spring accumulator 57 is arranged. The spring accumulator consists of an reservoir 58 in which a piston 59 is loaded by a spring 60. The reservoir 58 is arranged concentrically within the annular boost chamber 33 and connected thereto by a radial hole 61. The accumulator piston 59 is formed into a stepped piston. On the periphery of the larger step a seal 62 is fitted which seals off the reservoir 58 from the control chamber 54. The accumulator piston 59 is exposed to the pressure in the control chamber 54, in that the smaller step extends with clearance through a bore 63, concentric with the output control member, into the control chamber 54.

The output control member is aligned with an input control member 64. The input control member 64 forms a hydraulic piston, which seals the control chamber by means of a cup seal 65. At its outer end this hydraulic piston is sealed within guide bore 66 and at its rear end is held in contact with a spring ring 67 mounted in housing 30, by the effect of the pre-loaded accumulator spring 60 which urges the accumulator piston 59 against the input control member 64. The pre-load of accumulator spring 60 is less than that of the compression spring 48. The input control member is connected through a pedal rod (not shown) to the vehicle brake pedal through which the force $F_{p4}$ is applied.

The control chamber 54 is connected through port 68 and conduit 69 with the control port 23 of the control valve 4. Immediately in front of the cup seal 65 a compensating hole 70 is led into junction port 70. Junction port 70 is connected through hole 72 to an annular holding space 73 of the input control member 64. The junction port 71 is connected to the low pressure reservoir 13 via conduit 16, so that in the rest position of the input control member 64 the refilling of control chamber 54 is facilitated.

When servo-assistance is available, the operation of the power boost mechanism shown in FIG. 1 is as follows:

The control spool 8 is in its rest position as shown so that the fluid connection 10 to the power steering 3 is open via groove 9. The boost chamber 33 and the reservoir 58 are connected to the low pressure reservoir 13 because the exhaust connection via holes 26 is open. The control chamber 54 is also connected to the low pressure reservoir 13 via compensating hole 70, junction port 71 and conduit 16.

Referring to FIG. 1 — when force $F_{p1}$ is applied to the brake pedal, the input control member 64 is shifted to the left, shifting accumulator piston 59 until cup seal 65 has passed over the compensating hole 70. A small fluid volume is displaced thereby from reservoir 58 via boost chamber 33 into the, as yet, unpressurised conduit 35. This movement is also sufficient to take up play between the components of the power boost mechanism. Further movement of input control member 64 displaces fluid out of control chamber 54. Since at this time only a small pressure is developed in the control chamber fluid does not flow through port 68. Because the input control member 64 has a cross-sectional area (as illustrated in FIG. 1) about 1.5 times as great as that of the output control member 53 this member 53 and the boost piston 32 will be shifted to the left 1.5 times as far, or as quickly as the input control member 64.

Eventually by stroking the master cylinder a certain opposing force will be applied to the push rod 44 and an appreciable pressure must be built up in the control chamber 54 so that the braking process can proceed. This control pressure is fed to control spool 8 via port 68 conduit 69 and port 23. When the control pressure exceeds, for instance, 3 kg/cm² the opposing force of return spring 28 on the control spool 8 will be overcome and the control spool 8 will be displaced to the left. Because the differential area between input control member 64 and output control member 53 (as illustrated in FIG. 1) amounts to about 1.5 times the cross sectional area of the control piston 21 of the control spool 8, the control spool 8 is displaced to the left about 1.5 times as far, or as quickly, as the input control member 64. When the valve spool 8 is displaced to the left, this tends to closs off flat 9 between inlet port 7 and outlet port 10 leading to the steering gear 3, at the same time hole set 26 is closed to the return port 15 and hole set 27 is opened to the inlet port 7. High pressure from pump 2 is fed via axial channel 20, work port 25 conduit 35 and port 34 to the boost chamber 33, thus actuating the boost piston 32: The control spool is now partially forcebalanced, the smaller end portion of valve spool 8 which forms control piston 21 is not balanced out. As a result of the force of return spring 28 and the generally high working pressure during operation (e.g. 50 kg/cm²) the working pressure is slightly less than control pressure when the control spool is in balance. The pressure over the area of the control piston 21 is transmitted to the input control member 64. This same pressure is applied also to the output control member 53 so that the total area of boost piston 32 is subjected to substantially the same pressure. The pressure finally achieved depends on the stroke of control valve 8 to the left, this in turn being dependent on the stroke of the input control member 64. The output force of the boost piston 32 is therefore substantially proportional to the input force on the input control member 64 and is in fact in the ratio of the area of the boost piston 32 to the area of the input control member 64, in this case (as illustrated in FIG. 1) the ratio is about 3:1. On release of the pedal force applied through input control member 64 the above described process in reversed.

The operation of the power boost mechanism when power assistance is not available is described below. There are three basic cases in which operation without servo-assistance is required:

Case 1

A pressure failure — e.g. due to pump failure

Case 2

A mechanical failure — if for instance pressure is available at the control valve inlet port; but the control spool does not move under the force of the pressure developed in the control chamber, because, e.g. jamming has taken place due to contamination.

Case 3

An hydraulic failure where all fluid is lost from the device.

In the above mentioned three cases no pressure can be developed in the boost chamber and the operation of the power boost mechanism is as follows:

Case 1

At first the operation proceeds exactly as if servo-assistance were available, including the displacement of control spool 8 to the left. Displacement of the control spool 8 does not however lead to a corresponding increase in the working pressure, since no pump pressure is available. The vehicle driver instinctively increases the force applied to the brake pedal. This leads to an increase in pressure in the control chamber 54, until at (e.g.) 4kg/cm² the accumulator piston 59 is displaced into reservoir 58 against the force of spring 60, fluid being displaced out of control chamber 54 into that part of the pressure reservoir 57 lately occupied by accumulator piston 59. The volume displaced from reservoir 58 flows via boost chamber 33 into the failed boost circuit. Finally the input control member 63 can co-operate with output control-member 53 in such a manner that the stroke ratio input control member 63 to output control member 53 and boost piston 32 equals 1:1, i.e. a purely mechanical power transmission results.

In case that during this operation servo-pressure again becomes available at the input port 7 the changeover from the condition without boost to that with boost is smooth and gentle because the control pressure is about 4 kg/cm².

Case 2

The operation is the same as in Case 1 except that no working pressure can be developed because the boost chamber remains connected to the low pressure reservoir 13 via holes 26 of the control spool 8. Fluid displaced from reservoir 58 to the low pressure reservoir 13 refills the reservoir 58 via radial hole 61 and the boost chamber 33 during the pedal return stroke.

If the jammed control spool 8 should become free during the operation there will be slight differences. Assuming that the control spool 8 is jammed in its rest position, i.e. in the right-hand position as shown in FIG. 1, and the valve spool 8 becomes free before the input control member 64 abuts the output control member 53, the control spool 8 will be displaced slightly to the left and the control pressure will fall due to the incompressibility of the fluid contained in the control chamber 54. If the vehicle driver further depresses the brake pedal, the power boost mechanism takes up its normal booster operation again.

The spring accumulator 57 has three main functions: Firstly, it facilitates a gradual change-over from a hydraulic to a mechanical connection between input control member 64 and output control member 53. Secondly it achieves a gradual increase of control pressure compared with a change in the working pressure, because as a result of the force due to spring 60 the maximum difference between these pressures cannot be more than e.g. 4 kg/cm$^2$. This ensures that regardless of the force the vehicle driver applies to the brake pedal, a smooth, actuation of the boost piston will always be achieved, not only during operation with servo assistance but also during the change-over from operation without assistance to that with assistance. Thirdly it ensures the return of that fluid volume which is displaced from the control chamber 54.

Additionally, because in operation without servo-assistance, as a result of the inclusion of the spring accumulator 57 the maximum valve of the control pressure is appreciably reduced e.g. to substantially 4 kg/cm$^2$, the displacement of the input control member 64 against the resistance of this pressure is eased. Thus the spring accumulator 57 prevents a force loss between the input force applied to the input control member 64 and the output force developed by the output control member 53 which, in view of the fact that the input control member 64 has a greater area than the output control member 53, in order to achieve a favourable stroke ratio, would otherwise have been possible.

Case 3

If, for any reason the hydraulic fluid escapes from the valve housing 40 or the servomotor housing 72 the actuation of the mechanical power booster ensures in a purely mechanical fashion and the input control member 64 actuates the boost piston 32 by way of the output control member 53.

During every displacement of the boost piston 32 a part of the fluid volume of the low pressure chamber 36 is displaced through conduit 17 into the low pressure reservoir 13. On the return stroke of the boost piston 32 this volume flows back again under the influence of spring 48. Good lubrication is thereby assured between the boost piston 32, and the bore 31 which it is slidingly fitted, and to the push rod bearing.

In the following the variation of the invention illustrated in FIG. 2 will be described in assiciation with FIG. 1. FIG. 2 illustrates a modified portion of the Servomotor illustrated in FIG. 1, which shows an additional control valve between the input control member and the output control member. As described later with reference to curves FIG. 3 to FIG. 5 this arrangement improves the effectiveness of a servo-motor equipped with a pressure reservoir as in this invention.

In FIG. 2 the output control member 153 contains a spring accumulator 157. While the accumulator spring 160 is supported on one side by the boost piston 132, it presses the accumulator piston 159 on the other side against a shoulder 101 of the reservoir 158. The output control member 153 comprises a reduced diameter portion 102 that is fitted telescopically into a bore 103 of the input control member 164. The input control member 164 shows a greater effective diameter than the output control member 153. Between the base 104 of the bore 103 and the end face 105 of the portion 102 a pressure chamber is formed, in which spring 107, which forces the two control members 153 and 163 apart, is housed. The portion 102 is slidably sealed in bore 103 by means of a peripheral seal ring 108. The control chamber 154 is connected on the one hand by the radial bore 109 and the axial bore 110 to the accumulator piston 159 and on the other hand via a control valve 111 to the pressure chamber 106. The control valve 111 is arranged as a non-return valve. It is made up of, a valve rod 112 which extends with clearance through the bore 110, a conical closing member 113, which co-operates with a valve seat 114, a valve spring 115 and a snap ring 116. In its rest position the accumulator piston 159 under the force of the preloaded spring 160, holds the control valve 111 open; the piston 159 lifts the closing member 113 from the valve seat 114 by means of the valve rod 112 against the force of the valve spring 115 reacted by the snap ring 116. The compression spring 107 ensures that in the dormant condition the input control member 164 is held against spring ring 167 in its starting position. The spring force of the compression spring 107 is, correspondingly held lower than that of the compression spring 148.

The operation of the above described device is as follows when the whole system is in operational order:

After compensating hole 170 is overrun a pressure is built up in the control chamber 154, this pressure, as described with reference to FIG. 1 — controls the servo-valve 4. In contrast to the version in FIG. 1 accumulator piston 159 remains in its rest position. Because, as a result of the diameter difference between input and output control members 164, 153 resp. the latter moves further to the left, fluid flows through the open control valve 111 into pressure chamber 106. On relaxation of the input force this fluid flows back into the control chamber 154 since the control valve 111 is held open by the accumulator piston 159.

The failure cases described earlier with reference to FIG. 1 result in:

Case 1 a. On pressure failure in the boost chamber 133 are in the boost circuit, at first the input and output control members (164, 153 resp.) are separated from each other in accordance with the chosen stroke ratio. The pressure in the control chamber 154 climbs so high that the force of the spring 158 is overcome and the accumulator piston 159 moves to the left. Control valve 111 is thereby closed, so that the input control member 164 is solidly connected to the output control member 153 through an enclosed fluid column. The stroke ratio during further actuation is 1:1. In contrast to the version described in FIG. 1, a certain actuating stroke is saved here, since the input control member 164 does not move up to the output control member 153.

b. This advantage does not apply in the case of pressure failure in the control chamber 154 i.e. in the control circuit, because no fluid column is formed between input and output control members (164, 153 resp.). In this case the input control member 164 abuts the output control member 153 after some motion is lost.

Case 2

If the control spool 8 cannot be moved the actuation proceeds as in case 1. The only exception to this is that no displacement from the control chamber 154 is needed to stroke the control piston 21. In this case a certain actuating stroke is saved.

Case 3

In the case of a fluid loss in the boost circuit the power boost mechanism works as in case 1(a). In the case of a fluid loss in the control circuit or in the complete system the power boost mechanism works as in case 1(b).

Curves FIG. 3 to FIG. 5

The function: pedal force, or reaction force on the input control member, in relation to the developed braking pressure or boost pressure on the boost piston is shown.

The pedal force is signed $F_p$ the developed braking pressure $P_B$. The start point is identified by A and the commencement of braking by B. This ensues after all free play in the booster and in the brake system has been taken up. Point C identifies the pressure at which, typically, wheel lock occurs in a non-adaptive braking system. Point D represents the power run-out point of the power boost mechanism, at which the maximum possible boost pressure is being applied to the servo-motor. Above the power run-out point no more boost is available from the boost circuit. However the pedal force $F_p$ can be increased. E represents the point at which a solid coupling of the input with the output control member occurs, i.e. the input control member abuts the output control member. F indicates the point at which the maximum practical pedal force is achieved. This force could be achieved by spike or panic braking. The actuating stroke ends at F. G identifies the start of the return stroke of the input control member after a brake operation at maximum pedal force. At point H the return stroke power run-out begins. I indicates the point at which the maximum reaction force is transmitted to the input control member from the unboosted brake system.

In FIG. 4 the same quantities or points carry the same indication but with the index 1, because they refer to FIG. 1. The quantities and points in FIG. 5 refer to FIG. 2 and are tagged with the index 2.

Discussion of the FIG. 3 curve

FIG. 3 shows the brake pressure $P_B$ versus the pedal force $F_p$ in the case of an earlier power boost mechanism which included a control valve equipped with a non-return valve as described in the "state of the art." On operation, at maximum, to the power run-out point D i.e. above the wheel lock point in a non-adaptive braking system the return stroke exhibits the chain dotted hysteresis curve. On operation with the highest possible pedal force to the point F however, a gradual release of pedal force results in the hysteresis curve F, G, H, I, A. This curve has been obtained in trials and will be further elaborated.

After reaching the power run-out point D the non-return valve begins to open and allows fluid to escape from the control chamber. This allows the closing up of the input/output control members. These control members come mechanically together at point E — the conpling point. The steepness of the curve between D and E is especially dependent on the pre-load and the rate of the non-return valve spring. Above coupling point E the brake pressure $P_B$ climbs proportionally to the pedal force $F_p$ until at point F the assumed maximum pedal force is achieved. On slow withdrawal of the pedal force $F_p$ the non-return valve closes, the brake pressure falls very slightly until all force losses are overcome at point B and the return stroke begins. On further withdrawel of pedal force $F_p$ the brake pressure $P_B$ falls to point H. At point H the control pressure in the control chamber has fallen so low that the control valve begins to reduce the boost pressure again. The release of boost pressure leads to the brake reaction force on the boost piston being applied through the output control member to the input control member. This reaction force causes an increase in pedal force to point I. At point I control through the control valve is ended, the control spool being now in its rest position. The shape and length of the curve between H and I is mainly dependent on the speed at which the input control member and therefore the brake pedal is released. It can be said that the more slowly the brake pedal is released the more suddenly climbs the pedal force or reaction force between points H and I. Under point I the booster is non-operative, the brake pressure falls proportional to pedal force to the starting point A.

Discussion of the FIG. 4 curve

FIG. 4 shows the brake pressure $P_{B1}$ in relation to pedal force $F_{p1}$ in a power boost mechanism according to FIG. 1. Up to the point D the curve is substantially the same as in FIG. 3. After reaching point $D_1$ the accumulator piston 59 begins to be displaced, under the increased pressure in the control chamber 54 against the force of the accumulator spring 60 until finally the input control member 64 abuts the output control member 53. The steepness of the curve between D, E, is dependent on the rate and preload of spring 60. Above the coupling point E, the brake pressure $P_B$, climbs further proportional to pedal force $F_{p1}$, until the assumed maximum pedal force is reached at point $F_1$. At point $F_1$ the accumulator spring 60 has reached its maximum load. On slow release of pedal force $F_{p1}$ the brake pressure $P_{B1}$ falls very slightly until at point G, after all friction force losses are overcome the return stroke begins. On further release of pedal force the brake pressure falls correspondingly. The accumulator piston 59 moves gradually back to its rest position. While the accumulator piston ensures the return of fluid to the control chamber the control spool is held in a position corresponding to the instantaneous control pressure and thus to the instantaneous pedal force $F_{p1}$ and the boost pressure is maintained, maintaining therefore the brake pressure $P_{B1}$ proportional to pedal force $F_{p1}$. No point equivalent to point H in FIG. 3 could be determined in trials. The change-over from control above the run-out point to that under it is therefore smooth. Further release of pedal force $F_{p1}$ allows control piston 21 to return gradually to its rest position. During this part of the return stroke the brake pressure $P_{B1}$ is very nearly proportional to pedal force $F_{p1}$. As a result of the hydraulic ratio the input control member 64 separates from the output control member 53 until finally cup-seal 65 overruns the compensating hole 70 and the brake pressure falls to its starting point A1.

Summing up it can be said that the arrangement of the spring accumulator 57 between control chamber 54 and boost chamber 33 ensures that a sudden reactive pressure shock — as between points H and I in FIG. 3 — is prevented. A gradual release of brake force above run-out point is therefore facilitated: this is especially advantageous in brake operation in an adaptive braking circuit.

Discussion of the FIG. 5 curve

FIG. 5 shows the brake pressure $P_{B2}$ in relation to the pedal force $F_{p2}$ in a power boost mechanism according to FIG. 2. Up to point $D_2$ the curve is substantially the same as in FIG. 4. Further increase of pedal force $F_{p2}$ pushes the accumulator piston 159 against the force of its spring 160 into the reservoir 158 so that control valve 114 is allowed to close. On further increase of pedal force $F_{p2}$ the fluid column acts as a solid connection between input and output control members. As a result of this the brake pressure $P_{B2}$ climbs proportionally to the increasing pedal force $F_{p2}$. With a small play- say 1 mm — between control valve III and its seat 114 no point equivalent to E1 in FIG. 4 can be detected on test. This point coincides with D2. This means a nearer approach to a proportional curve and a better control of brake pressure $P_{B2}$ above the run-out point $D_2$. Only through the use of a spring accumulator sensitive to the pressure difference between control and boost chambers was this improvement possible.

As already demonstrated the advantages of the invention become apparent only above the power run-out point of the power boost mechanism. As a rule the run-out point D1, D2 lies above the wheel lock point C1, C2 at which a wheel in a non-adaptive brake system locks. Apart from the already mentioned case of its use in an adaptive braking system a further case must be considered in which the advantages of this improvement are important. This 4th case occurs when the power run-out point D1 or D2 falls under the wheel lock point C1 or C2. For example a pump can work at reduced pressure because of e.g. belt slip or relief valve leakage so that possibly only half the nominal pressure is available. If the control spool jams in its mid position the effect is similar. In these cases the curve shown chain-dotted in FIG. 5 results and the same addantages apply as have already been described.

As already known from the quoted state of the art variations of a structural nature fall within the scope of the invention and are not to be further elaborated here.

However the invention is not limited to the arrangement of the pressure accumulator within the servomotor 5. The pressure accumulator can be accomodated anywhere so long as it is subjected to control pressure on one side and boost pressure on the other. It can for instance be arranged between conduits 35 and 69 or inside the control spool 21 between port 23 and axial chamber 20 of the servo-valve 4.

We claim:

1. A power boost mechanism comprising a housing defining a fluid receiving working chamber and a fluid receiving control chamber therewithin, a piston slidably mounted in said working chamber, an operator-actuated input plunger slidably mounted in said control chamber for controlling the fluid pressure level in said control chamber, valve means responsive to the fluid pressure level in said control chamber to shift from a release position venting said working chamber, said valve means communicating successively higher fluid pressure levels into said working chamber as the valve means is shifted from the rest position, an output plunger operatively connected to said piston and extending into said control chamber, a reservoir defined within said housing, a spring biased pressure differential responsive piston slidable in said reservoir, said spring biased piston having opposed faces on opposite ends thereof, said faces being communicated to the fluid pressure level in the working chamber and in the control chamber respectively, said spring biased piston being responsive to an increase of the fluid pressure level in said control chamber over the pressure level in the working chamber to shift from a rest position to enlarge the effective volume of the control chamber to reduce the fluid pressure level therein, and means carried by the spring biased piston to prevent communication through said reservoir between the working and control chamber regardless of the magnitude of the pressure differential across the spring biased piston.

2. The invention of claim 1, wherein said reservoir is defined within said output plunger.

3. The invention of claim 2, wherein said reservoir is concentric with said working chamber.

4. The invention of claim 3, wherein said spring biased piston is yieldably urged into engagement with said input plunger.

5. The invention of claim 4, wherein said differential pressure responsive piston is stepped to define larger and smaller diameter portions, said larger diameter portion sealingly engaging the wall of said reservoir, said reservoir defining an opening in one end thereof, the smaller diameter portion of said pressure differential responsive piston projecting through said aperture when the pressure level in the control chamber is below a predetermined level.

6. The invention of claim 1, wherein said inlet plunger has a larger diameter than a diameter of said output plunger, said input plunger defining a bore therewithin to slidably receive one end of said output plunger, said said output plunger and said input plunger defining a cavity therebetween communicated with said control chamber, and valve mechanism controlling communication between said cavity and said control chamber, said valve mechanism being controlled by said spring biased pressure differential responsive piston.

7. The invention of claim 6, wherein said valve mechanism is located within said output plunger.

8. The invention of claim 6, wherein said valve mechanism includes a valve stem for operating said mechanism, and resilient means yieldably urging said valve mechanism closed, said valve stem engaging said pressure differential responsive piston.

* * * * *